United States Patent
Mitina et al.

(10) Patent No.: US 7,166,158 B2
(45) Date of Patent: Jan. 23, 2007

(54) QUINACRIDONE PIGMENT COMPOSITIONS COMPRISING UNSYMMETRICALLY SUBSTITUTED COMPONENTS

(75) Inventors: Valentina K. Mitina, Tarrytown, NY (US); Kevin Rodney Gerzevske, Wilmington, DE (US); Stéphane Biry, Village-Neuf (FR); Christine Halik, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/890,452

(22) Filed: Jul. 13, 2004

(65) Prior Publication Data
US 2005/0011403 A1 Jan. 20, 2005

Related U.S. Application Data

(60) Provisional application No. 60/572,239, filed on May 18, 2004.

(51) Int. Cl.
*C09B 48/00* (2006.01)
*C09B 67/52* (2006.01)

(52) U.S. Cl. .................. 106/495; 106/31.77; 106/497; 430/105; 430/108.2; 546/49; 546/56

(58) Field of Classification Search ............. 106/31.77, 106/495, 497; 430/105, 108.2; 546/49, 546/56
See application file for complete search history.

(56) References Cited

U.S. PATENT DOCUMENTS 3,287,147 A * 11/1966 Wilkinson .................. 106/495
3,836,379 A * 9/1974 Kirsch et al. ............... 106/495
5,457,203 A * 10/1995 Hendi et al. .................. 546/56
5,972,099 A * 10/1999 Badejo et al. .............. 106/494
5,989,333 A * 11/1999 Urban et al. ................. 106/495
5,994,427 A * 11/1999 Kappele et al. ............. 523/160
6,013,127 A * 1/2000 Babler ........................ 106/497
6,251,553 B1 * 6/2001 Baur et al. ............. 430/108.21
6,312,512 B1 * 11/2001 Urban et al. ................. 106/495
6,313,300 B1 * 11/2001 Hendi .......................... 546/49

FOREIGN PATENT DOCUMENTS

| EP | 0445768 | 9/1991 |
| FR | 1269093 | 8/1961 |
| GB | 896916 | 5/1962 |
| GB | 1390093 | 4/1975 |

OTHER PUBLICATIONS

R. H. Altiparmakian et al., Helvetica Chimica Acta, vol. 55, Fasc. 1, (1972), Nos. 11-12, pp. 85-100, no month.
W. Herbst et al. "Industrial Organic Pigments, Production, Properties, Applications" Second, Completely Revised Edition, 1997, p. 465, 3.2.4 Commercially Available Quinacridone Pigments, no month.

* cited by examiner

*Primary Examiner*—Anthony J. Green
(74) *Attorney, Agent, or Firm*—Shiela A. Loggins

(57) ABSTRACT

The present invention relates to a novel quinacridone pigment compositions, a process using a mixed amine synthesis for the ultimate production of the compositions and to their use as colorants for pigmenting high molecular weight organic materials.

16 Claims, No Drawings

QUINACRIDONE PIGMENT COMPOSITIONS COMPRISING UNSYMMETRICALLY SUBSTITUTED COMPONENTS

This application claims the benefit of U.S. Provisional Application No. 60/488,338 filed Jul. 18, 2003 and U.S. Provisional Application No. 60/572,239 filed May 18, 2004.

The present invention relates to novel quinacridone pigment compositions, to a process for the preparation of these compositions and to their use as colorants for pigmenting high molecular weight organic materials.

BACKGROUND OF THE INVENTION

Quinacridones are well known compounds which are used as pigments. Quinacridones are usually prepared by oxidizing dihydroquinacridones in an alkaline medium in the presence of solvents and then dry- or wet-grinding the resulting coarsely crystalline crude pigments, or by ring closure of 2,5-dianilinoterephthalic acid in polyphosphoric acid or polyphosphoric ester and then phase-converting and finishing the resulting finely divided crude pigments with organic solvents.

Under certain conditions different quinacridones mix with each other to form solid solutions which are quite different from both physical mixtures of the compounds and from the compounds themselves. A solid solution is defined as a solid, homogeneous mixture of two or more constituents which may vary in composition between certain limits and remain homogeneous. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. Solid solutions are also referred to as mixed crystals.

Mixtures of quinacridone isomers are disclosed in Great Britain Application No. 1,390,093 and Helvitica Chimica Acta (1972), 55(1), 85–100.

In contrast to simple physical mixtures wherein the color is usually a direct function of the additive effects of the two or more components, solid solutions give unexpected and unpredictable hues. It is impossible to generalize about the direction or the degree of color shift.

Moreover, it is frequently observed that a remarkable enhancement of lightfastness is accompanied by the formation of solid solutions. In physical mixtures of two pigments, the components show their individual behaviors, frequently resulting in marked changes of hue as one fades more than the other. In contrast, solid solutions behave as single substances with respect to any change in hue and characteristically show superior lightfastness.

SUMMARY OF THE INVENTION

It has been found that novel quinacridone compositions having at least one unsymmetrical quinacridone can be produced by means of the mixed amine preparation process described below. The term "compositions" includes also solid solutions of the components. The preparation process includes the synthesis of the dianilinoterephthalic acid intermediates starting from a dialkylsuccinylo succinate and at least two different amines, which are then subjected to ring closure reaction to produce the quinacridone compositions.

DESCRIPTION OF THE PREFERRED EMBODIMENTS

The invention therefore provides pigment compositions of the quinacridone series comprising (a) at least one symmetrical quinacridone of formula

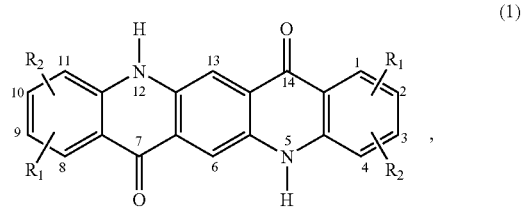

(1)

(b) at least one unsymmetrical quinacridone of formula

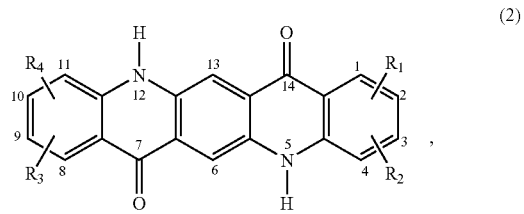

(2)

and (c) at least one symmetrical quinacridone of formula

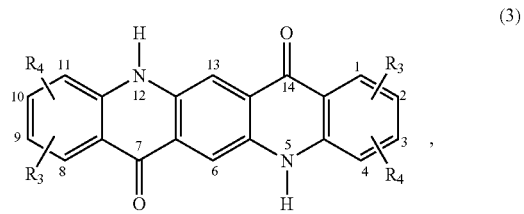

(3)

in which $R_1$, $R_2$, $R_3$ and $R_4$ are each independently of the other hydrogen, $C_1$–$C_4$alkyl unsubstituted or substituted by halogen, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, carboxy or nitro, wherein at least one of $R_1$ and $R_2$ is different from each of $R_3$ and $R_4$ and/or at least one of the positions of $R_1$ and $R_2$ is different from each of the positions of $R_3$ and $R_4$, with the proviso that the unsymmetrical b) quinacridone is not 1,10-dimethylquinacridone or 1,10-dichloroquinacridone.

If the unsymmetrical component b) is disubstituted and the substituents are the same, then preferably the quinacridone is not substituted in the 1,10 position of the quinacridone ring.

As $C_1$–$C_4$alkyl radicals there come into consideration, for example, methyl, ethyl, n-propyl, isopropyl, n-butyl, sec-butyl, tert-butyl and isobutyl, preferably methyl and ethyl, especially methyl. $C_1$–$C_4$alkyl radicals are unsubstituted, as exemplified above, or mono-, di- or tri-substituted by halogen, for example, fluorine or chlorine. Examples of the substituted radicals are chloromethyl or trifluoromethyl, preferably trifluoromethyl.

As $C_1$–$C_4$alkoxy radicals there come into consideration, for example, methoxy, ethoxy, n-propoxy, isopropoxy, n-butoxy, sec-butoxy, tert-butoxy and isobutoxy, preferably methoxy and ethoxy, and especially methoxy.

As halogen there come into consideration, for example, fluorine, chlorine, bromine and iodine, preferably chlorine and fluorine, and especially chlorine.

As N—$C_1$–$C_4$alkylcarbamoyl radicals there come into consideration, for example, N-methylcarbamoyl, N-ethylcarbamoyl, N-propylcarbamoyl, N-isopropylcarbamoyl, N-butylcarbamoyl, N-sec-butylcarbamoyl and N-tert-butylcarbamoyl, preferably N-methylcarbamoyl and N-ethylcarbamoyl, especially N-methylcarbamoyl.

As N,N-di-$C_1$–$C_4$alkylcarbamoyl radicals there come into consideration, for example, N,N-di-methylcarbamoyl, N-methyl-N-ethylcarbamoyl, N, N-di-ethylcarbamoyl and N,N-di-propylcarbamoyl, preferably N,N-di-methylcarbamoyl.

As N,N-di-$C_1$–$C_4$alkylamino radicals there come into consideration, for example, N,N-dimethylamino and N,N-diethylamino, preferably N,N-dimethylamino.

The radicals $R_1$ bound to each of the terminal phenyl rings of the quinacridone compound of formula (1) and to one of the terminal phenyl rings of the quinacridone compound of formula (2) have identical meanings and are bound to corresponding positions. The radicals $R_2$ bound to each of the terminal phenyl rings of the quinacridone compound of formula (1) and to one of the terminal phenyl rings of the quinacridone compound of formula (2) have identical meanings and are bound to corresponding positions. The radicals $R_3$ bound to each of the terminal phenyl rings of the quinacridone compound of formula (3) and to one of the terminal phenyl rings of the quinacridone compound of formula (2) have identical meanings and are bound to corresponding positions. The radicals $R_4$ bound to each of the terminal phenyl rings of the quinacridone compound of formula (3) and to one of the terminal phenyl rings of the quinacridone compound of formula (2) have identical meanings and are bound to corresponding positions.

For purposes of this application, "corresponding positions" as opposed to "different positions" means identical positions of radicals bound to each of the opposing terminal phenyl rings in one molecule, for example, numbered position "1" in the compound of formula (1), (2) or (3) corresponds to numbered position "8", "2" corresponds to "9", "3" corresponds to "10" and "4" corresponds to "11". For purposes of this application, "corresponding positions" as opposed to "different positions", furthermore, includes radicals bound to positions of identical numerical denotations in the compounds of formulae (1), (2) and (3), for example, numbered position "1" in the compound of formula (1) corresponds to numbered position "1" in the compounds of formula (2) and (3).

For purposes of this application, the compounds of formulae (1) and (3) are, consequently, referred to as symmetrical quinacridones. For purposes of this application, the compound of formula (2), consequently, is referred to as an unsymmetrical quinacridone, since at least one of the radicals $R_1$ and $R_2$ is different from each of the radicals $R_3$ and $R_4$ or, if the radicals $R_1$ and $R_2$ are identical with the radicals $R_3$ and $R_4$, at least one of the positions of $R_1$ and $R_2$ is different from each of the positions of $R_3$ and $R_4$.

Symmetrical quinacridones of formulae (1) and (3) are, for example, unsubstituted quinacridone, 3,10-dichloroquinacridone, 2,9-dichloroquinacridone, 2,9-difluoroquinacridone, 4,11-dimethylquinacridone, 4,11-dichloroquinacridone, 2,9-dimethylquinacridone, 2,9-dimethoxyquinacridone, 2,9-di-N-methylcarbamoylquinacridone and 2,9-dimethyl-3,10-dichloroquinacridone.

An unsymmetrical quinacridone of formulae (2) is, for example, 2-methyl-9-chloroquinacridone, 2-methylquinacridone, 2-fluoroquinacridone, 4-chloroquinacridone, 2,10-dichloroquinacridone, 3,11-dimethylquinacridone, 2,11-dichloroquinacridone, 4-methyl-9-methoxyquinacridone, 2-methyl-11-methoxyquinacridone, 2,11-dimethoxyquinacridone, 2-methyl-3-chloroquinacridone and 2-methyl-3,10-dichloroquinacridone.

In a preferred embodiment of the present invention $R_1$, $R_2$, $R_3$ and $R_4$ each denote independently of the other hydrogen, $C_1$–$C_4$alkyl, $C_1$–$C_4$alkoxy, halogen, carbamoyl, N—$C_1$–$C_4$alkylcarbamoyl, N,N-di-$C_1$–$C_4$alkylcarbamoyl or N,N-di-$C_1$–$C_4$alkylamino, especially hydrogen, chlorine, fluorine, methyl, methoxy or N,N-dimethylamino.

In an interesting embodiment of the present invention the composition comprises (a) at least one symmetrical quinacridone of formula

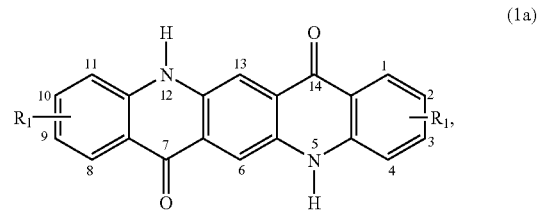

(1a)

(b) at least one unsymmetrical quinacridone of formula

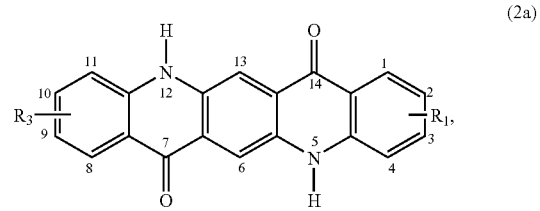

(2a)

and (c) at least one symmetrical quinacridone of formula

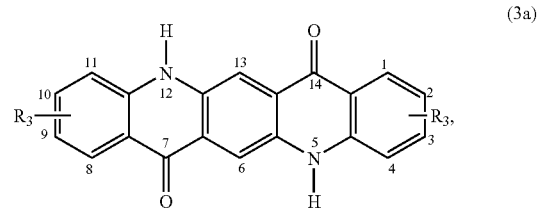

(3a)

in which $R_1$ and $R_3$ are each independently of the other hydrogen, $C_1$–$C_4$alkyl unsubstituted or substituted by halogen, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, carboxy or nitro, wherein $R_1$ is different from $R_3$ and/or the position of $R_1$ is different from the position of $R_3$, with the proviso that the unsymmetrical b) quinacridone is not 1,10-dimethylquinacridone or 1,10-dichlorquinacridone.

$R_1$ is different from $R_3$, i.e. $R_1$ and $R_3$ are not identical. In another embodiment of the present invention $R_1$ and $R_3$ are identical, but located in different positions of the terminal phenyl rings which do not correspond to each other. In still another embodiment of the present invention $R_1$ and $R_3$ are not identical and located in different positions of the terminal phenyl rings which do not correspond to each other.

Preferably $R_1$ denotes $C_1$–$C_4$alkyl, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, trifluoromethyl, carboxy or nitro, especially $C_1$–$C_4$alkyl, $C_1$–$C_4$alkoxy, halogen, carbamoyl, N—$C_1$–$C_4$alkylcarbamoyl, N,N-di-$C_1$–$C_4$alkylcarbamoyl or N,N-di-$C_1$–$C_4$alkylamino, and $R_3$ is hydrogen.

Especially $R_1$ denotes chlorine, fluorine, methyl, methoxy or N,N-dimethylamino, preferably chlorine, methyl or methoxy, and $R_3$ is hydrogen.

In a particularly preferred embodiment $R_1$ denotes methyl, and $R_3$ is hydrogen.

The quinacridone pigment compositions according to the present invention comprise, for example, from 0.2 to 99% by weight of the at least one symmetrical component of formula (1), from 0.2 to 99% by weight of the at least one symmetrical component of formula (3), and from 0.1 to 50% by weight of at least one unsymmetrical component of formula (2), based on the total weight of the components of formulae (1), (2) and (3) in the composition.

The quinacridone pigment compositions according to the present invention comprise, for example, from 55 to 99% by weight, preferably from 65 to 95% by weight, especially from 70 to 90% by weight of at least one symmetrical component of formula (1), and from 1 to 45% by weight, preferably from 5 to 35% by weight, especially from 10 to 30% by weight of the sum of at least one unsymmetrical component of formula (2) and at least one symmetrical component of formula (3), based on the total weight of the components of formulae (1), (2) and (3) in the composition. The quinacridone pigment compositions according to the present invention comprise, for example, from 5 to 44.9% by weight, preferably from 10 to 34.5% by weight, especially from 10 to 29% by weight of at least one asymmetrical component of formula (2) and from 0.1 to 40% by weight, preferably from 0.5 to 25% by weight, especially from 1 to 20% by weight of at least one symmetrical component of formula (3), based on the total weight of the components of formulae (1), (2) and (3) in the composition.

None of components (1), (2) or (3) are less than 0.1 percent by weight based on the total weight of the components of formulae (1), (2) and (3) in the composition. Preferably none of the components (1), (2) or (3) are less than 1.0 percent by weight based on the total weight of the components of formulae (1), (2) and (3) in the composition.

Preferably the quinacridone pigment compositions according to the present invention do not contain any substantial amount of a pigment other than the quinacridone pigments of the formulae (1), (2) and (3).

The compositions according to the present invention can be obtained by intimately mixing the components, but preferably are prepared by simultaneous cyclization of the mixture of 2,5-diarylamino terephthalic acid intermediates which are prepared according to the process given below.

A preferred composition according to the present invention is a solid solution comprising the compounds of formulae

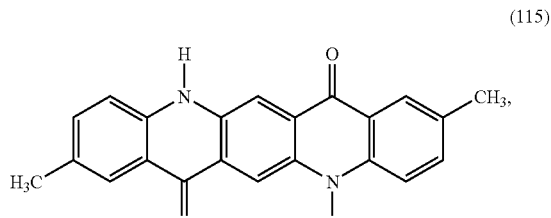
(115)

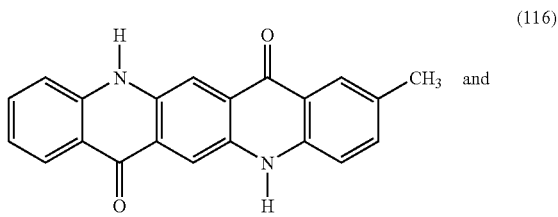
(116) and

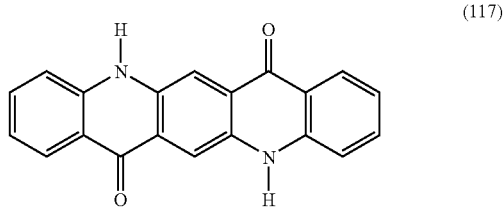
(117)

in a ratio of (90 to 1):(50 to 10):(85 to 0.2) as established by the relative peak areas according to HPLC.

Accordingly, a further subject is directed to a process for the preparation of the quinacridone composition of the present invention, which comprises (i) reacting a compound of formula

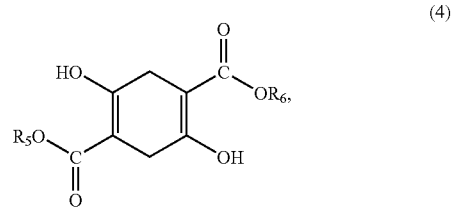
(4)

in which $R_5$ and $R_6$ are each independently of the other $C_1$–$C_4$alkyl, with at least double the molar amount of a mixture of the amines of formulae

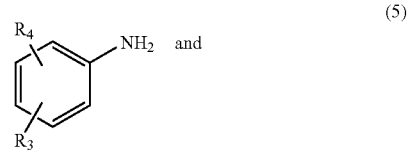
(5)

-continued (6)

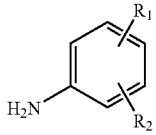

wherein the amines of formulae (5) and (6) are added simultaneously or sequentially to yield a composition comprising at least one compound of formula (7)

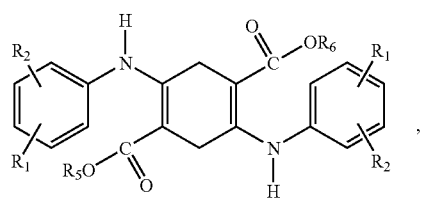

at least one compound of formula (8)

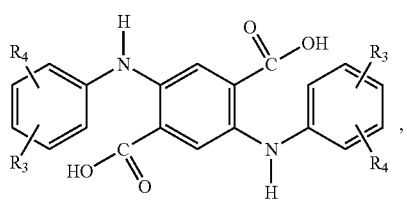

and at least one compound of formula (9)

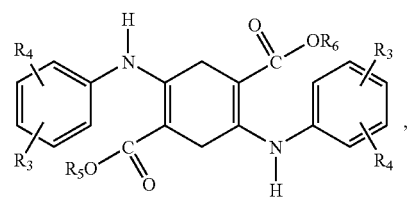

(ii) oxidizing and hydrolyzing the composition obtained according to step (i), to yield a composition comprising at least one compound of formula (10)

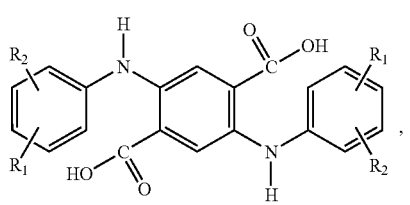

at least one compound of formula (11)

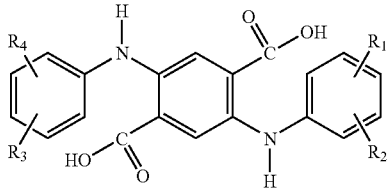

and at least one compound of formula (12)

and (iii) cyclizing of the composition obtained according to step (ii) to yield a composition comprising (a) at least one symmetrical quinacridone of formula (1),
(b) at least one unsymmetrical quinacridone of formula (2), and
(c) at least one symmetrical quinacridone of formula (3) as defined above, in which $R^1$, $R_2$, $R_3$ and $R_4$ have the meanings and preferences as given above, wherein at least one of $R_1$ and $R_2$ is different from each of $R_3$ and $R_4$ and/or at least one of the positions of $R_1$ and $R_2$ is different from each of the positions of $R_3$ and $R_4$.

The radicals $R_5$ and $R_6$ are each independently of the other $C_1$–$C_4$alkyl, for example, methyl, ethyl, n-propyl, isopropyl, n-butyl, sec-butyl, tert-butyl and isobutyl, preferably methyl and ethyl, especially methyl. The radicals $R_5$ and $R_6$ are identical or not identical, preferably identical.

Preferably, the compound of formula (4) is dimethylsuccinylo succinate or diethylsuccinylo succinate, in particular dimethylsuccinylo succinate.

In a preferred embodiment, the condensation reaction between a compound of formula (4), in which $R_5$ and $R_6$ are each independently of the other $C_1$–$C_4$alkyl and at least the two- to fourfold molar amount of a mixture of the amines of formulae (5) and (6) wherein the amines of formulae (5) and (6) are added simultaneously or sequentially to yield a composition comprising at least one compound of formula (7), at least one compound of formula (8) and at least one compound of formula (9) is performed in the presence of hydrochloric acid or sulfuric acid in an amount of 0.04 to 1.10 per mol of the compound of formula (4) as a catalyst and in the presence of a solvent, preferably a lower alcohol having 1 to 4 carbon atoms, in an oxygen-free atmosphere at a reaction temperature between 80° C. and 130° C.

The composition of the intermediate 2,5-dianilinoterephthalic acid compounds of formulae (10), (11) and (12) is prepared by condensation of the dialkylsuccinylo succinate of formula (4) with at least double the molar amount of a mixture of at least two different amines of formulae (5) and (6), suitably, in the presence of an organic solvent, for example, an alcohol containing from one to four carbon atoms, at elevated temperature under normal or elevated pressure, as the case may be. Judiciously, the 2,5-dianilino-3,6-dihydro-terephthalic acid ester derivatives of formulae (7), (8) and (9) obtained according to step (i) are submitted to oxidation and hydrolysis according to step (ii) with or without, preferably without, isolation of the intermediate product.

In an interesting embodiment of the present invention, the 2,5-dianilino-3,6-dihydroterephthalic acid ester derivatives of formulae (7), (8) and (9) are prepared under normal pressure.

Suitable amines of formulae (5) and (6) are, for example, aniline; halogen-substituted aniline compounds, including para-chloroaniline, ortho-chloroaniline, para-fluoroaniline, ortho-fluoroaniline; $C_1$–$C_4$alkyl-substituted aniline compounds, including para-toluidine and ortho-toluidine; $C_1$–$C_4$alkoxy-substituted aniline compounds, including para-anisidine, ortho-anisidine, meta-anisidine; dialkyl amino-substituted aniline, such as para-dimethylaminoaniline; and disubstituted aniline compounds, such as 3-chloro-4-methylaniline. The amine of formula (5) is different from the amine of formula (6) with respect to the meaning and/or the position of the radicals $R_1$, $R_2$, $R_3$ and $R_4$, as indicated above.

Preferred amines of formulae (5) and (6) are aniline, para-chloroaniline, ortho-chloroaniline, para-fluoroaniline, para-toluidine, para-anisidine and para-dimethylaminoaniline.

In an interesting embodiment of the preparation process according to the present invention, aniline is used as the amine of formula (5) and para-chloroaniline, ortho-chloroaniline, para-fluoroaniline, para-toluidine, para-anisidine or para-dimethylaminoaniline, preferably para-chloraniline, ortho-chloroaniline, para-toluidine or para-anisidine, especially para-toluidine, is used as the amine of formula (6).

Suitably, the amine of formula (5) is applied in the preparation process according to the present invention in an amount, for example, of from 1 to 70% by weight, preferably 1 to 45% by weight and especially 1 to 30% by weight, based on the total weight of the amines of formulae (5) and (6) in the reaction mixture. The lower limit of the amine of formulae (5) is preferably 5% by weight and especially 10% by weight, based on the total weight of the amines of formulae (5) and (6) in the reaction mixture.

The amines of formulae (5) and (6) are added simultaneously or sequentially to the dialkylsuccinylo succinate of formula (7). Alternatively, the amines are added to the reaction sequentially. For example, the amine of formula (5) is added separately to the dialkylsuccinylo succinate. The amine of formula (6) is then added to the reaction mixture after a period of 0.5 to 4 hours, preferably 1 to 3 hours. Alternatively, amine of formula (6) is added first, followed by amine of formula (5).

Oxidation of the mixture of 2,5-dianilino-3,6-dihydro-terephthalic acid ester derivatives of formulae (7), (8) and (9) according to step (ii) is carried out, for example, in a solvent mixture or a mixture of a solvent with water in the presence of an oxidizing agent and alkali at elevated temperatures under normal or elevated pressure. As the oxidizing agent there come into consideration, for example, sodium m-nitrobenzensulfonate, nitrobenzene, nitronaphthalene, nitrobenzenesulfonic acid or nitrophenol, preferably sodium m-nitrobenzensulfonate. As the solvent there come into consideration, for example, polar organic solvents such as methanol, ethanol, acetone, ethylene glycol or glycol ether or a mixture thereof, preferably, methanol or ethanol or a mixture thereof.

A preferred composition of intermediate compounds obtained after the oxidizing and hydrolyzing step according to (ii) is a composition comprising the compounds of formulae

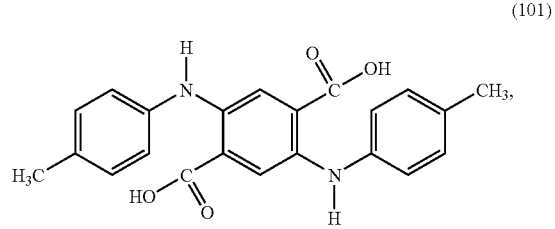

(101)

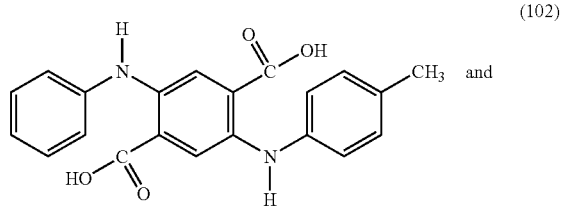

(102) and

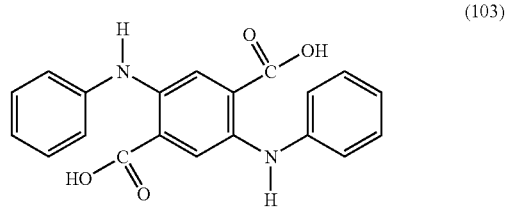

(103)

in a ratio of (85 to 1):(50 to 10):(85 to 1) as established by the relative peak areas according to HPLC.

Judiciously, the mixture of 2,5-dianilinoterephthalic acid compounds of formulae (10), (11) and (12) is cyclized according to step (iii) by heating in the presence of a ring closure agent.

As the ring closure agent use is made, for example of from 2.5 to 10 times, preferably from 3 to 6 times, the amount by weight of polyphosphoric acid or polyphosphoric ester, for example polyphosphoric methyl ester, or a mixture thereof, based on the total weight of 2,5-dianilinoterephthalic acid compounds of formulae (10), (11) and (12). The $P_2O_5$ content of the polyphosphoric acid or ester is, for example, between 80 and 87% by weight, preferably between 83 and 85% by weight, corresponding to a phosphoric acid equivalent of from 110 to 120%. Larger amounts of ring closure agent can be used but are generally unnecessary. The ring closure temperature is judiciously from 80 to 200° C., preferably from 120 to 140° C. The time taken to complete cyclization is in general from 0.5 to 24 hours, but usually only 1 to 3 hours.

The ring closure mixture which is present after cyclization is hydrolyzed at a temperature, for example, of at least 50° C., preferably at from 50 to 180° C., in particular 60 to 125° C., using water or dilute phosphoric acid, alone or in the presence of an organic solvent that is inert under the reaction conditions, such as an aromatic hydrocarbon, under ordinary or elevated pressure, as the case may be. In the case water or dilute phosphoric acid is used for the hydrolysis the ring closure mixture is metered into the water or the dilute phosphoric acid. Alternatively, the converse procedure can be adopted. Hydrolysis can be conducted continuously or batchwise. Based on the polyphosphoric acid, from 2 to 10 times the amount of water or dilute phosphoric acid are generally employed. The duration of hydrolysis depends on the metering rate and is, for example, from 0.5 to 24 hours, preferably from 0.5 to 5 hours.

Alternatively, the ring closure mixture which is present after the cyclization is hydrolyzed at a temperature, for example, of at least 110° C., preferably at from 120 to 180° C., in particular from 130 to 160° C. In this case the ring closure mixture, under pressure if desired, is metered into orthophosphoric acid, by metering into an amount of, for example, at least 70% strength by weight, preferably from 75 to 98% strength by weight, in particular from 80 to 90% strength by weight, aqueous orthophosphoric acid which is such that at the end of the metered addition the concentration of aqueous orthophosphoric acid in the hydrolyzed mixture is, judiciously, at least 85% by weight. It is possible to use a continuous or batchwise procedure. It is advantageous to operate continuously in a static or mechanical mixer. Based on the polyphosphoric acid, it is judicious to use from 0.8 to 10 times the amount of orthophosphoric acid. In principle it is also possible to use a less than 70% strength by weight orthophosphoric acid. Preferably, the concentration of orthophosphoric acid in the hydrolysis mixture at the end of the hydrolysis is from 87 to 98% by weight, in particular from 88 to 95% by weight.

In an alternative embodiment, the hydrolyzation according to step (ii) and the cyclization according to step (iii) are performed prior to the oxidation according to step (ii).

By virtue of the choice of the amount and the kind of amines of formulae (5) and (6) and accordingly the dianilinoterephthalic acids of formulae (10), (11) and (12), the ring closure conditions and the hydrolysis conditions, functional mixed crystal pigments which can be isolated by customary methods are obtained directly after the hydrolysis procedure. For certain end uses it may be advantageous to subject the resulting finely divided mixed crystals (in this case referred to as prepigments) to a finishing treatment at elevated temperatures, or first of all coarsely crystalline mixed crystal crude pigments are obtained, which for certain applications are advantageously subjected to mechanical grinding and, directly or following a finishing treatment, are converted to a functional pigment form.

The mixed crystal prepigments may be subjected, with or without isolation beforehand, to an aftertreatment with or without the addition of solvents at a temperature, for example, of from 50 to 200° C. However, an aftertreatment step may be omitted and the mixed crystal prepigments are ready for use without aftertreatment. The liquid medium may have an alkaline pH, for example, from 7.5 to 13, but preferably the pH is neutral. The coarsely crystalline mixed crystal crude pigments are subjected to mechanical fine division and then the resulting mixed crystal pigments are isolated in the customary manner or are subjected, with or without isolation beforehand, to a finishing treatment, as described above, and following the separation of the liquid medium are isolated. Fine division can be brought about by dry or wet grinding. Preference is given to wet grinding with high energy input, since for this purpose it is not necessary to dry the mixed crystal crude pigment.

Dry grinding is suitably conducted using batchwise or continuous vibrating mills or roll mills, and wet grinding using batchwise or continuous stirred ball mills, roll mills and vibrating mills and also kneading apparatus. For wet grinding, the mixed crystal crude pigment suspensions directly—or following isolation beforehand, the moist presscakes or the dried, coarsely crystalline mixed crystal crude pigments—are diluted to a millable consistency with water, dilute sodium hydroxide solution and/or a preferably water-miscible solvent. The grinding media used are beads of zirconium oxide, zirconium mixed oxide, aluminum oxide, steel or quartz with a diameter of from 0.2 to 20 mm. The duration of grinding is, for example between 5 and 60 minutes, preferably between 7.5 and 30 minutes.

The mixed crystal prepigments which are present following hydrolysis or fine division can be subjected to a finishing treatment in aqueous suspension, directly or following the addition of solvents, or in an organic medium. The conditions to be observed for conducting the finishing treatment are to a high degree dependent on the desired properties of the mixed crystal pigments and are directed in each case toward that aim. Normally, the suspension of the mixed crystal prepigments in the relevant medium is treated at a temperature, for example, from 50 to 200° C. at atmospheric or elevated pressure from 0.5 to 24 hours, preferably at from 50 to 150° C. for from 1 to 6 hours. In general, the suspension obtained after wet grinding is employed for this purpose, without isolation of the millbase beforehand. The amount of solvent added here can vary within wide limits. It is preferred to use from the same to up to 5 times the amount by weight of solvent, based on the weight of the mixed crystal prepigments. After the end of finishing, the solvents used for that purpose can be recovered by distillation and used again. Utilizing the variants available in this way it is possible, depending on the end use, to convert the mixed crystal prepigments obtained by the process of the invention into a higher-hiding or more transparent form, which can be controlled via the solvency of the relevant solvent, its concentration, the chosen temperature and the duration of the finishing treatment.

In order to improve the color properties and to obtain particular color effects, it is possible at any point in the process to add solvents, surfactants, defoamers, extenders, inorganic salts, such as sodium sulfate or other additives. It is also possible to use mixtures of these additives. The additives can be added all at once or in two or more portions. The addition can be made before, during or after ring closure, during high-temperature hydrolysis, during grinding or during the finishing treatment, or during or after isolation.

Suitable surfactants are anionic, cationic and nonionic surfactants. Examples of suitable anionic surfactants are fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates, fatty acids, for example, palmitic, stearic and oleic acid, soaps, e.g., alkali metal salts of fatty acids, naphthenic acids and resin acids, e.g., abietic acid, and alkali-soluble resins, e.g., rosin-modified maleate resins.

Examples of suitable cationic surfactants are quaternary ammonium salts, fatty amine ethoxylates, fatty amine polyglycol ethers and fatty amines. Examples of nonionic surfactants are fatty alcohol polyglycol ethers, fatty acid polyglycol esters and alkylphenol polyglycol ethers.

Examples of solvents are: alicyclic hydrocarbons, such as cyclohexane; $C_1$–$C_8$-alkanols, alicyclic alcohols and polyhydric alcohols, such as methanol, ethanol, n- or isopropanol, n- or isobutanol, tert-butanol, pentanols, hexanols, cyclohexanol, ethylene glycol, propylene glycol, glycerol; $C_1$–$C_5$-dialkyl ketones or cyclic ketones, such as acetone, diethyl ketone, methyl isobutyl ketone, methyl ethyl ketone or cyclohexanone; ethers and glycol ethers, such as the monomethyl or monoethyl ether of ethylene glycol or propylene glycol, butylglycol, ethyldiglycol or methoxybutanol; aromatic hydrocarbons, such as toluene, o-, m- or p-xylene or ethylbenzene, cyclic ethers, such as tetrahydrofuran, chlorinated aromatic hydrocarbons, such as chlorobenzene, o-dichlorobenzene, 1,2,4-trichlorobenzene or bromobenzene; substituted aromatic compounds, such as benzoic acid, nitrobenzene or phenol; aliphatic carboxamides, such as formamide or dimethylformamide; cyclic carboxamides, such as N-methylpyrrolidone; $C_1$–$C_4$-alkyl carboxylates, such as butyl formate, ethyl acetate or propyl propionate; carboxylic acid $C_1$–$C_4$-glycol esters, $C_1$–$C_4$-alkyl phthalates and $C_1$–$C_4$-alkyl benzoates, such as ethyl benzoate; heterocyclic bases, such as pyridine, quinoline, morpholine or picoline; and also dimethyl sulfoxide and sulfolane.

Preferred solvents are alkanols, especially ethanol, propanols, butanols and pentanols; aliphatic carboxamides such as formamide or dimethylformamide; cyclic carboxamides, especially N-methylpyrrolidone; aromatic hydrocarbons, such as toluene, o-, m- or p-xylene or ethylbenzene; and chlorinated aromatic hydrocarbons, such as chlorobenzene or o-dichlorobenzene.

The mixed crystal pigments prepared in accordance with the invention including those wherein the unsymmetrical quinacridone (b) is 1,10-dimethylquinacridone can be used to pigment high molecular mass organic materials of natural or synthetic origin, such as plastics, resins, coating materials or printing inks, for example.

Examples of high molecular weight organic materials pigmentable with said pigments are cellulose ethers and cellulose esters, such as ethylcellulose, nitrocellulose, cellulose acetate or cellulose butyrate, natural resins or synthetic resins, such as addition polymerization resins or condensation resins, examples being amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures. Preferably, the high molecular weight organic materials pigmentable with said pigments have a molecular weight in the range of $10^3$ to $10^8$ g/mol.

In this context it is irrelevant whether the high molecular weight organic compounds referred to are in the form of plastic masses or melts or in the form of spinning solutions, varnishes, paints or printing inks. Depending on the intended use it is found advantageous to utilize the pigments obtained in accordance with the invention including those wherein the unsymmetrical quinacridone (b) is 1,10-dimethylquinacridone as blends or in the form of preparations or dispersions. Based on the high molecular mass organic material to be pigmented, the pigments of the invention are employed in an amount of preferably from 0.1 to 10%.

The mixed pigments of the invention including those wherein the unsymmetrical quinacridone (b) is 1,10-dimethylquinacridone are suitable as colorants in electrophotographic toners and developers, such as, for example, one- or two-component powder toners (so-called one- or two-component developers), magnetic toners, liquid toners, latex toners, polymerization toners and specialty toners. Typical toner binders are addition polymerization resins, polyaddition resins and polycondensation resins, such as styrene resins, styrene-acrylate resins, styrene-butadiene resins, acrylate resins, polyester resins, phenol-epoxy resins, polysulfones, polyurethanes, individually or in combination, and also polyethylene and polypropylene, which may also contain further ingredients, such as charge control agents, waxes or flow aids, or may be modified subsequently with these additives.

Dispersions of the pigments of the invention including those wherein the unsymmetrical quinacridone (b) is 1,10-dimethylquinacridone are ideally suited in particular as concentrates for preparing printing inks or for direct use in printing inks which have excellent applications properties and attractive colouristics with high colour strength.

The invention therefore additionally provides a printing ink for a printing ink concentrate comprising a pigment of the invention including those wherein the unsymmetrical quinacridone (b) is 1,10-dimethylquinacridone.

Furthermore, the mixed pigments of the invention including those wherein the unsymmetrical quinacridone (b) is 1,10-dimethylquinacridone are suitable as colorants in powders and powder coating materials, especially in triboelectrically or electrokinetically sprayable powder coating materials which are used to coat the surfaces of articles made, for example, from metal, wood, plastic, glass, ceramic, concrete, textile material, paper or rubber. As powder coating resins it is typical to use epoxy resins, carboxyl- and hydroxyl-containing polyester resins, polyurethane resins and acrylic resins together with customary hardeners. Resin combinations are also used. For example, epoxy resins are frequently used in combination with carboxyl- and hydroxyl-containing polyester resins. Examples of typical hardener components (depending on the resin system) are acid anhydrides, imidazoles and also dicyandiamide and its derivatives, blocked isocyanates, bisacylurethanes, phenolic resins and melamine resins, triglycidyl isocyanurates, oxazolines and dicarboxylic acids.

Furthermore, the mixed crystal pigments of the invention including those wherein the unsymmetrical quinacridone (b) is 1,10-dimethylquinacridone are suitable as colorants in inkjet inks on an aqueous and nonaqueous basis and also in those inks which operate in accordance with the hot-melt process.

Such printing inks are, for example, a liquid or paste-form dispersion that comprises pigments, binders and also optionally solvents and/or optionally water and additives. In a liquid printing ink, the binder and, if applicable, the additives are generally dissolved in a solvent. Customary viscosities in the Brookfield viscometer are, for example, from 20 to 5000 mPa·s, for example from 20 to 1000 mPa·s, for liquid printing inks. For paste-form printing inks, the values range, for example, from 1 to 100 Pa·s, preferably from 5 to 50 Pa·s. The person skilled in the art will be familiar with the ingredients and compositions of printing inks.

Suitable pigments, like the printing ink formulations customary in the art, are generally known and widely described.

Printing inks comprise pigments advantageously in a concentration of, for example, from 0.01 to 40% by weight, preferably from 1 to 25% by weight, especially from 5 to 10% by weight, based on the total weight of the printing ink.

The printing inks can be used, for example, for intaglio printing, flexographic printing, screen printing, offset printing, lithography or continuous or dropwise ink-jet printing on material pre-treated in accordance with the process of the invention using generally known formulations, for example in publishing, packaging or shipping, in logistics, in advertising, in security printing or in the field of office equipment.

Suitable printing inks are both solvent-based printing inks and water-based printing inks. Of interest are, for example, printing inks based on aqueous acrylate. Such inks are to be understood as including polymers or copolymers that are obtained by polymerisation of at least one monomer containing a group

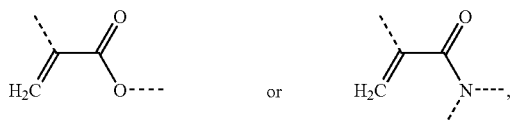

and that are dissolved in water or a water-containing organic solvent. Suitable organic solvents are water-miscible solvents customarily used by the person skilled in the art, for example alcohols, such as methanol, ethanol and isomers of propanol, butanol and pentanol, ethylene glycol and ethers thereof, such as ethylene glycol methyl ether and ethylene glycol ethyl ether, and ketones, such as acetone, ethyl methyl ketone or cyclo, for example isopropanol. Water and alcohols are preferred.

Suitable printing inks comprise, for example, as binder primarily an acrylate polymer or copolymer and the solvent is selected, for example, from the group consisting of water, $C_1$–$C_5$alcohols, ethylene glycol, 2-($C_1$–$C_5$alkoxy)-ethanol, acetone, ethyl methyl ketone and any mixtures thereof.

In addition to the binder, the printing inks may also comprise customary additives known to the person skilled in the art in customary concentrations.

For intaglio or flexographic printing, a printing ink is usually prepared by dilution of a printing ink concentrate and can then be used in accordance with methods known per se. The printing inks may, for example, also comprise alkyd systems that dry oxidatively. The printing inks are dried in a known manner customary in the art, optionally with heating of the coating.

A suitable aqueous printing ink composition comprises, for example, a pigment or a combination of pigments, a dispersant and a binder.

Dispersants that come into consideration include, for example, customary dispersants, such as water-soluble dispersants based on one or more arylsulfonic acid/formaldehyde condensation products or on one or more water-soluble oxalkylated phenols, non-ionic dispersants or polymeric acids.

The arylsulfonic acid/formaldehyde condensation products are obtainable, for example, by sulfonation of aromatic compounds, such as naphthalene itself or naphthalene-containing mixtures, and subsequent condensation of the resulting arylsulfonic acids with formaldehyde. Such dispersants are known and are described, for example, in U.S. Pat. No. 5,186,846 und DE-A-19727767. Suitable oxalkylated phenols are likewise known and are described, for example, in U.S. Pat. No. 4,218,218 und DE-A-19727767. Suitable non-ionic dispersants are, for example, alkylene oxide adducts, polymerisation products of vinylpyrrolidone, vinyl acetate or vinyl alcohol and co- or ter-polymers of vinyl pyrrolidone with vinyl acetate and/or vinyl alcohol.

It is also possible, for example, to use polymeric acids which act both as dispersants and as binders.

Examples of suitable binder components that may be mentioned include acrylate-group-containing, vinyl-group-containing and/or epoxy-group-containing monomers, prepolymers and polymers and mixtures thereof. Further examples are melamine acrylates and silicone acrylates. The acrylate compounds may also be non-ionically modified (e.g. provided with amino groups) or ionically modified (e.g. provided with acid groups or ammonium groups) and used in the form of aqueous dispersions or emulsions (e.g. EP-A-704 469, EP-A-12 339). Furthermore, in order to obtain the desired viscosity the solventless acrylate polymers can be mixed with so-called reactive diluents, for example vinyl-group-containing monomers. Further suitable binder components are epoxy-group-containing compounds.

The printing ink compositions may also comprise as additional component, for example, an agent having a water-retaining action (humectant), e.g. polyhydric alcohols, polyalkylene glycols, which renders the compositions especially suitable for ink-jet printing.

It will be understood that the printing inks may comprise further auxiliaries, such as are customary especially for (aqueous) ink-jet inks and in the printing and coating industries, for example preservatives (such as glutardialdehyde and/or tetramethylolacetyleneurea, anti-oxidants, degassers/defoamers, viscosity regulators, flow improvers, anti-settling agents, gloss improvers, lubricants, adhesion promoters, anti-skin agents, matting agents, emulsifiers, stabilisers, hydrophobic agents, light stabilisers, handle improvers and anti-statics. When such agents are present in the compositions, their total amount is generally $\leq 1\%$ by weight, based on the weight of the preparation.

It is also possible for the printing inks to comprise buffer substances, for example borax, borate, phosphate, polyphosphate or citrate, in amounts of e.g. from 0.1 to 3% by weight, in order to establish a pH value of e.g. from 4 to 9, especially from 5 to 8.5.

As further additives, such printing inks may comprise surfactants or humectants. Surfactants that come into consideration include commercially available anionic and non-ionic surfactants. Humectants that come into consideration include, for example, urea or a mixture of sodium lactate (advantageously in the form of a 50 to 60% aqueous solution) and glycerol and/or propylene glycol in amounts of e.g. from 0.1 to 30% by weight, especially from 2 to 30% by weight, in the printing inks.

Furthermore, the printing inks may also comprise customary additives, for example foam-reducing agents or especially substances that inhibit the growth of fungi and/or bacteria. Such additives are usually used in amounts of from 0.01 to 1% by weight, based on the total weight of the printing ink.

The printing inks may also be prepared in customary manner by mixing the individual components together, for example in the desired amount of water.

As already mentioned, depending upon the nature of the use, it may be necessary for e.g. the viscosity or other physical properties of the printing ink, especially those properties which influence the affinity of the printing ink for the substrate in question, to be adapted accordingly.

The printing inks are also suitable, for example, for use in recording systems of the kind in which a printing ink is expressed from a small opening in the form of droplets which are directed towards a substrate on which an image is formed. Suitable substrates are, for example, textile fibre materials, paper, plastics or aluminium foils pretreated by the process according to the invention. Suitable recording systems are e.g. commercially available ink-jet printers.

Preference is given to printing processes in which aqueous printing inks are used.

The mixed pigments of the invention including those wherein the unsymmetrical quinacridone (b) is 1,10-dimethylquinacridone are also suitable as colorants for color filters, both for additive and for subtractive color generation.

The mixed pigments according to the present invention including those wherein the unsymmetrical quinacridone (b) is 1,10-dimethylquinacridone are distinguished by outstanding coloristic and Theological properties, high color strength, ease of dispersibility, high thermostability, e.g. in plastic applications, and high transparency, e.g. in paint and ink applications.

The following Examples illustrate the invention in more detail. They are not to be construed as limiting the instant invention in any manner whatsoever. The invention is declared to cover all changes and modifications of the specific examples which do not constitute a departure from the spirit and scope of the invention. Unless otherwise indicated, the temperatures are given in degrees Celsius, parts are parts by weight and percentages relate to percent by weight. Parts by weight relate to parts by volume in a ratio of kilograms to liters.

Weights percent are determined for the intermediates such as the terephthalic acid, 2,5-bis(p-toluidine) by liquid chromatography using a modular LC-Systeme instrument, 15 cm length, 4.6 mm diameter column filled with Eclipse CDB-C18 5 μm filling material. Flow is 1 ml/min. Solvent system is 55/45 water and acetonitrile. The analysis is run at 40° C. Detection wavelengths are 240 and 245, Weights percent for the final quinacridone products are determined using the same liquid chromatography equipment above and flow rate but a solvent system of 70/30 water and tetrahydrofuran. Detection wavelengths are 290 and 295 nm.

EXAMPLE 1

A pressure reactor autoclave is charged with 30 parts of well dried dimethylsuccinylo succinate (1,4-cyclohexanedione-2,5-di-carboxylic acid methyl ester), 5.6 parts of aniline, 23.6 parts of para-toluidine, 300 parts of methanol and 0.9 parts of hydrochloric acid (35%). The autoclave is tightly closed and flushed with nitrogen gas and the pressure is set at a gauge pressure of 0 kg/cm². While the mixture is vigorously stirred, the temperature in the autoclave is increased from room temperature to 90° C. over 15 minutes and the mixture is allowed to react for 5 hours. Then, the reaction mixture is cooled to 30° C. or lower and the pressure is released to atmospheric pressure. The autoclave is charged with 40 parts of a sodium hydroxide solution (50%) and 34.6 parts of sodium m-nitrobenzenesulfonate and tightly closed. The mixture is stirred for 10 minutes and the temperature in the autoclave is increased from room temperature to 90° C. over 15 minutes. Then the mixture is allowed to react for 5 hours, cooled to 30° C. or lower and filtered to remove any solids. The remaining solution is heated to a temperature of 30–40° C. with stirring. 18 parts of hydrochloric acid (35%) are added dropwise and the mixture is maintained at this temperature for 30 minutes. Then, the mixture is filtered, the filter cake obtained is washed with a mixture of water/methanol (1/1) and cold water and then dried to give 48 parts of a composition comprising the compounds of formulae

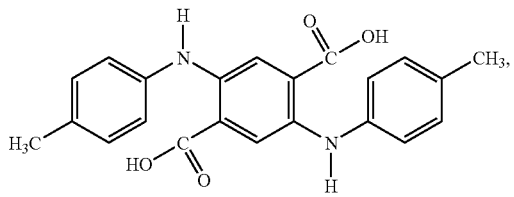

(101)

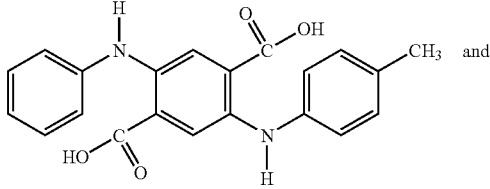

(102)

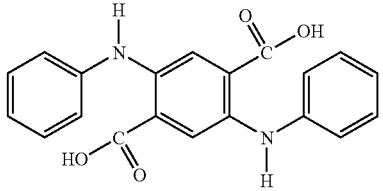

(103)

in a ratio of 72.24:25.86:1.9 as established by the relative peak areas, this according to HPLC.

EXAMPLE 2

A flask equipped with a condenser and a nitrogen inlet tube is charged with 30 parts of well dried dimethylsuccinylo succinate (1,4-cyclohexanedione-2,5-di-carboxylic acid methyl ester), 5.6 parts of aniline, 23.6 parts of para-toluidine, 300 parts of ethanol and 0.9 parts of hydrochloric acid (35%) and flushed with nitrogen gas. While the mixture is vigorously stirred, the temperature is increased from room temperature to 78° C. over 15 minutes and the mixture is allowed to react for 4 hours. The reaction mixture is cooled to 30° C. or less and the flask is charged with 72 parts of an aqueous potassium hydroxide solution (50%) and 34.6 parts of sodium m-nitrobenzenesulfonate. The temperature is increased to 78° C. over 15 minutes while stirring and the mixture is allowed to react for 5 hours. The reaction mixture is cooled to 30° C. or lower and filtered to remove any solids. The remaining solution is heated to a temperature of 30–40° C. with stirring. 23 parts of hydrochloric acid (35%) are added dropwise and the mixture is maintained at this temperature for 30 minutes. Then, the mixture is filtered, the filter cake obtained is washed with a mixture of water/methanol (1/1) and cold water and then dried to give 48 parts of a composition comprising the compounds of formulae (101), (102) and (103) in a ratio of 72.2:25.9:1.9 as established by the relative peak areas according to HPLC.

EXAMPLE 2A

A flask equipped with a condenser and a nitrogen inlet tube is charged with 30 parts of well dried dimethylsuccinylo succinate (1,4-cyclohexanedione-2,5-di-carboxylic acid methyl ester), 7.08 parts of aniline, 300 parts of ethanol and 0.9 parts of hydrochloric acid (35%) and flushed with nitrogen gas. While the mixture is vigorously stirred, the temperature is increased from room temperature to 78° C. over 15 minutes and the mixture is allowed to react for 2.5 hr. The reaction mixture is cooled to 40–45° C., 23.6 parts of para-toluidine were added and the mixture was refluxed 2.5 hr more. The reaction mixture is cooled to 30° C. or less and the flask is charged with 72 parts of an aqueous potassium hydroxide solution (50%) and 34.6 parts of sodium m-nitrobenzenesulfonate. The temperature is increased to 78° C. over 15 minutes while stirring and the mixture is allowed to react for 5 hours. The reaction mixture is cooled to 30° C. or lower and filtered to remove any solids. The remaining solution is heated to a temperature of 30–40° C. with stirring. 23 parts of hydrochloric acid (35%) are added dropwise and the mixture is maintained at this temperature for 30 minutes. Then, the mixture is filtered, the filter cake obtained is washed with a mixture of water/methanol (1/1) and cold water and then dried to give 48 parts of a composition comprising the compounds of formulae (101), (102) and (103) in a ratio of 63.6:21.5:4.6 as established by the relative peak areas according to HPLC.

EXAMPLE 2B

A flask equipped with a condenser and a nitrogen inlet tube is charged with 30 parts of well dried dimethylsuccinylo succinate (1,4-cyclohexanedione-2,5-di-carboxylic acid methyl ester), 23.6 parts of para-toluidine, 300 parts of ethanol and 0.9 parts of hydrochloric acid (35%) and flushed with nitrogen gas. While the mixture is vigorously stirred, the temperature is increased from room temperature to 78° C. over 15 minutes and the mixture is allowed to react for 2.5 hr. The reaction mixture is cooled to 40–45° C., 7.08 parts of aniline were added and the mixture was refluxed 2.5 hr more. The reaction mixture is cooled to 30° C. or less and the flask is charged with 72 parts of an aqueous potassium hydroxide solution (50%) and 34.6 parts of sodium m-nitrobenzenesulfonate. The temperature is increased to 78° C. over 15 minutes while stirring and the mixture is allowed to react for 5 hours. The reaction mixture is cooled to 30° C. or lower and filtered to remove any solids. The remaining solution is heated to a temperature of 30–40° C. with stirring. 23 parts of hydrochloric acid (35%) are added dropwise and the mixture is maintained at this temperature for 30 minutes. Then, the mixture is filtered, the filter cake obtained is washed with a mixture of water/methanol (1/1) and cold water and then dried to give 48 parts of a composition comprising the compounds of formulae (101), (102) and (103) in a ratio of 77.4:3.85;8.75 as established by the relative peak areas according to HPLC.

EXAMPLE 3

The procedure of Example 1 is repeated, but using 10 parts of glacial acetic acid as the catalyst instead of hydrochloric acid (35%). 47.8 parts of a composition comprising the compounds of formulae (101), (102) and (103) are obtained in a ratio of 73.04:24.86:2.1 as established by the relative peak areas according to HPLC.

EXAMPLE 4

The procedure of Example 1 is repeated, but using 4.5 parts of sulfuric acid (98%) as the catalyst instead of hydrochloric acid (35%). 47.3 parts of a composition comprising the compounds of formulae (101), (102) and (103) are obtained in a ratio of 72.75:25.35:1.9 as established by the relative peak areas according to HPLC.

EXAMPLES 5 TO 17

The procedure of Example 1 is repeated, but using in each case the amount of aniline and p-toluidine as stated in columns 2 and 3 of Table 1. A composition comprising the compounds of formulae (101), (102) and (103) is obtained in each case. The ratio of the components as established by the relative peak areas according to HPLC is given in columns 4, 5 and 6 of Table 1.

TABLE 1

| Example # | Amount of aniline (parts) | Amount of p-toluidine (parts) | Compound of formula (101) | Compound of formula (102) | Compound of formula (103) |
|---|---|---|---|---|---|
| 5 | 2.8 | 26.8 | 80.9 | 18.1 | 1.0 |
| 6 | 5.6 | 23.5 | 72.24 | 25.86 | 1.9 |
| 7 | 8.4 | 20.4 | 59.23 | 35.84 | 4.93 |
| 8 | 11.2 | 18.2 | 47.04 | 42.49 | 10.47 |
| 9 | 15 | 15 | 31.14 | 43.58 | 25.28 |
| 10 | 20 | 15.3 | 19.6 | 44.05 | 36.35 |
| 11 | 24.4 | 10.7 | 14.56 | 31.42 | 54.02 |
| 12 | 25.3 | 3.3 | 1.31 | 15.87 | 82.82 |
| 13 | 7.1 | 23.6 | 63.34 | 34.42 | 2.24 |
| 14 | 6.0 | 25.6 | 70.35 | 27.85 | 1.8 |
| 15 | 4.4 | 25.0 | 69.94 | 28.97 | 1.09 |
| 16 | 4.4 | 22.3 | 67.38 | 30.7 | 1.92 |
| 17 | 6.1 | 21.5 | 62.6 | 34.5 | 3.1 |

EXAMPLE 18

The procedure of Example 1 is repeated, but using 11.8 parts of aniline and 28.7 parts of para-chloroaniline instead of 5.6 parts of aniline and 23.6 parts of para-toluidine. 49.2 parts of a composition comprising the compounds of formulae

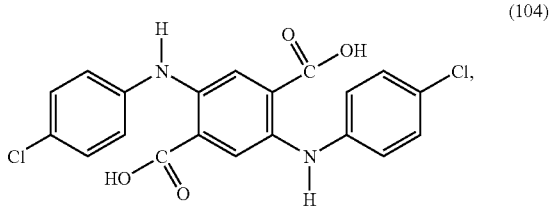

(104)

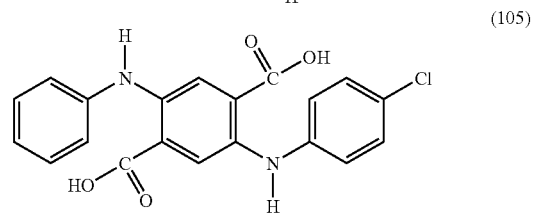

(105)

and (103) are obtained in a ratio of 54.9:35.0:10.1 as established by the relative peak areas according to HPLC.

EXAMPLE 19

The procedure of Example 1 is repeated, but using 11.8 parts of aniline and 28.7 parts of ortho-chloroaniline instead of 5.6 parts of aniline and 23.6 parts of para-toluidine. 43.3 parts of a composition comprising the compounds of formulae

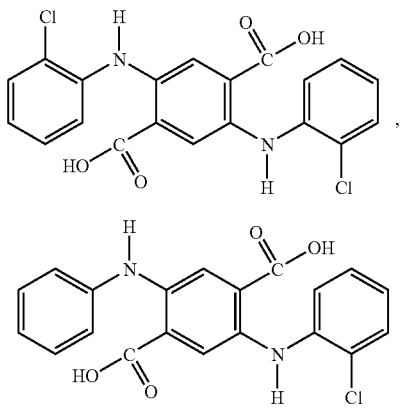

and (103) in a ratio of 40.7:39.0:20.3 as established by the relative peak areas according to HPLC.

EXAMPLE 20

The procedure of Example 2 is repeated, but using 11.8 parts of aniline and 27.63 parts of para-anisidine instead of 5.6 parts of aniline and 23.6 parts of para-toluidine. 46.3 parts of a composition comprising the compounds of formulae

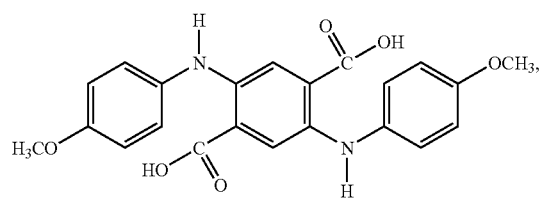

and (103) are obtained in a ratio of 56.9:20.4:22.7 as established by the relative peak areas according to HPLC.

EXAMPLE 21

The procedure of Example 2 is repeated, but using 11.8 parts of aniline and 25 parts of para-fluoroaniline instead of 5.6 parts of aniline and 23.6 parts of para-toluidine. 47.1 parts of a composition comprising the compounds of formulae

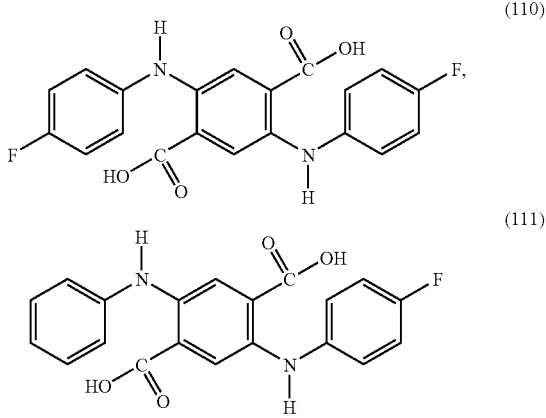

and (103) are obtained in a ratio of 45.0:45.3:9.7 as established by the relative peak areas according to HPLC.

EXAMPLE 22

The procedure of Example 2 is repeated, but using 11.8 parts of aniline, 13.5 parts of ortho-chloroaniline and 10.8 parts of para-anisidine instead of 5.6 parts of aniline and 23.6 parts of para-toluidine. 45.1 parts of a composition comprising the compounds of formulae (103), (106), (107), (108), (109) and

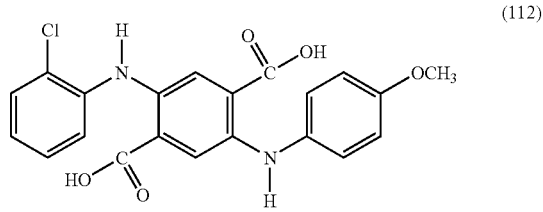

are obtained.

EXAMPLE 23

The procedure of Example 2 is repeated, but using 11.8 parts of aniline, 13.5 parts of para-anisidine and 10,8 parts of para-toluidine instead of 5.6 parts of aniline and 23.6 parts of para-toluidine. 45.1 parts of a composition comprising the compounds of formulae (101), (102), (103), (108), (109) and

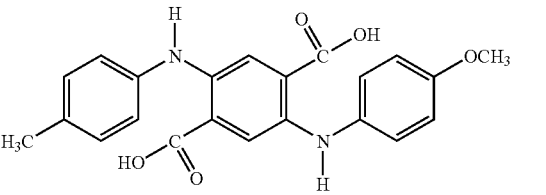

are obtained.

EXAMPLE 24

The procedure of Example 2 is repeated, but using 11.8 parts of aniline, 13.5 parts of para-anisidine and 10,8 parts of para-flouroaniline instead of 5.6 parts of aniline and 23.6 parts of para-toluidine. 45.1 parts of a composition comprising the compounds of formulae (103), (108), (109), (110), (111) and

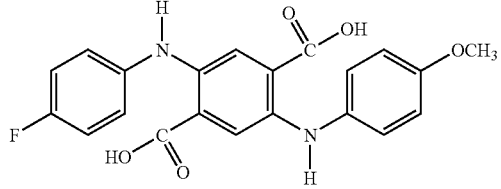
(114)

are obtained.

EXAMPLE 25

250 parts of polyphosphoric acid containing $P_2O_5$ (85.0%) are metered into a stirred vessel. Then 45 parts of the product obtained according to Example 1 are added at 90° C. with stirring and the mixture is heated to 125° C. for 3 hours during which ring closure takes place. The mixture is cooled to 110° C. and 6 parts of water are gradually added over 10 minutes. Then, the mixture is poured into 750 parts of water at 50° C. and stirred at 60° C. for 1.5 hours. The solid is collected by filtration and washed with water until the washing water is neutral. 100 parts of the presscake obtained are reslurried in 170 parts of methanol and the slurry is heated in a pressure reactor at about 90° C. for 3 hours. The mixture is cooled and the pH is adjusted to 9–9.5 with sodium hydroxide solution (50%). The solid is collected by filtration and washed with water. The wet presscake is dried in an oven or used as it is. Upon drying in an oven at 80° C., about 19 parts of a solid solution are collected comprising the compounds of formulae (115)

(116) and (117)

in a ratio of 69.7:28.1:2.2 as established by the relative peak areas according to HPLC.

EXAMPLE 25A 250 parts of polyphosphoric acid containing $P_2O_5$ (85.0%) are metered into a stirred vessel. Then 45 parts of the product obtained according to Example 2A are added at 90° C. with stirring and the mixture is heated to 125° C. for 3 hours during which ring closure takes place. The mixture is cooled to 110° C. and 6 parts of water are gradually added over 10 minutes. Then, the mixture is poured into 750 parts of water at 50° C. and stirred at 60° C. for 1.5 hours. The solid is collected by filtration and washed with water until the washing water is neutral. 100 parts of the presscake obtained are reslurried in 170 parts of methanol and the slurry is heated in a pressure reactor at about 90° C. for 3 hours. The mixture is cooled and the pH is adjusted to 9–9.5 with sodium hydroxide solution (50%). The solid is collected by filtration and washed with water. The wet presscake is dried in an oven or used as it is. Upon drying in an oven at 80° C., about 19 parts of a solid solution are collected comprising the compounds of formulae (115), (116) and (117) in a ratio of in a ratio of 70.3:25.2:4.5, as established by the relative peak areas according to HPLC

EXAMPLE 25B 250 parts of polyphosphoric acid containing $P_2O_5$ (85.0%) are metered into a stirred vessel. Then 45 parts of the product obtained according to Example 2B are added at 90° C. with stirring and the mixture is heated to 125° C. for 3 hours during which ring closure takes place. The mixture is cooled to 110° C. and 6 parts of water are gradually added over 10 minutes. Then, the mixture is poured into 750 parts of water at 50° C. and stirred at 60° C. for 1.5 hours. The solid is collected by filtration and washed with water until the washing water is neutral. 100 parts of the presscake obtained are reslurried in 170 parts of methanol and the slurry is heated in a pressure reactor at about 90° C. for 3 hours. The mixture is cooled and the pH is adjusted to 9–9.5 with sodium hydroxide solution (50%). The solid is collected by filtration and washed with water. The wet presscake is dried in an oven or used as it is. Upon drying in an oven at 80° C., about 19 parts of a solid solution are collected comprising the compounds of formulae (115), (116) and (117) in a ratio of in a ratio of 86.6:4.6:8.9 as established by the relative peak areas according to HPLC

EXAMPLE 26

250 parts of polyphosphoric acid containing $P_2O_5$ (85.0%) are metered into a stirred vessel. Then 45 parts of the product obtained according to Example 1 are added at 90° C. with stirring and the mixture is heated to 125° C. for 3 hours during which ring closure takes place. The mixture is cooled to 110° C. and 6 parts of water are gradually added over 10 minutes. Then the mixture is poured into 750 parts of water at 50° C. and stirred at 60° C. for 1.5 hours. The solid is collected by filtration and washed with water until the washing water is neutral. 100 parts of the presscake obtained are reslurried in 150 parts of ethanol, 15 parts of sodium hydroxide solution (50%) and C-33 surfactant (cocoalkyl quaternary ammonium salt, 33% sol.) and the slurry is heated in a pressure reactor at about 120° C. for 5 hours. The mixture is cooled, the solid is collected by filtration and washed with water. The wet presscake is dried in an oven at 80° C. About 19 parts of a solid solution are collected comprising the compounds of formulae (115), (116) and (117) in a ratio of 69.7:28.1:2.2 as established by the relative peak areas according to HPLC.

EXAMPLES 27 TO 39

The procedure of Example 26 is repeated, but using as the starting material the mixture of terephthalic acids according to Examples 5 to 17 given in Table 1. About 19 parts of a solid solution are collected in each case comprising the compounds of formulae (115), (116) and (117). The ratio of the components as established by the relative peak areas according to HPLC is stated in columns 3, 4 and 5 of Table 2.

TABLE 2

| Example # | Mixture of terephthalic acids according to Ex. # | Compound of formula (117) | Compound of formula (116) | Compound of formula (115) |
|---|---|---|---|---|
| 27 | 5  | 0.4  | 12.9 | 86.7 |
| 28 | 6  | 2.2  | 28.2 | 69.7 |
| 29 | 7  | 5.4  | 37.3 | 57.4 |
| 30 | 8  | 11.8 | 45.9 | 42.3 |
| 31 | 9  | 27.3 | 44.8 | 27.9 |
| 32 | 10 | 34.2 | 41.1 | 24.7 |
| 33 | 11 | 53.5 | 31.6 | 14.9 |
| 34 | 12 | 82.9 | 15.9 | 1.2  |
| 35 | 13 | 2.2  | 32   | 65.7 |
| 36 | 14 | 1.2  | 24.5 | 74.4 |
| 37 | 15 | 1.0  | 23.4 | 75.5 |
| 38 | 16 | 2.1  | 27.8 | 70.1 |
| 39 | 17 | 3.1  | 34.4 | 62.6 |

EXAMPLE 40

The procedure of Example 26 is repeated, but using as the starting material the mixture of terphthalic acids according to Example 18. About 19 parts of a solid solution are collected comprising the compounds of formulae

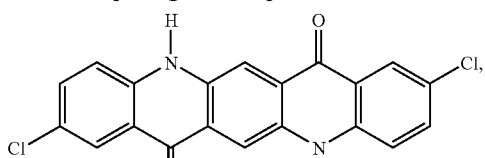
(118)

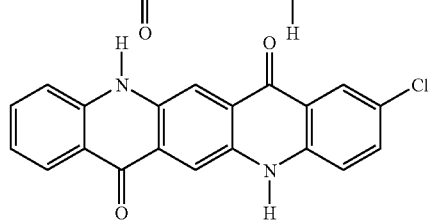
(119)

and (117) in a ratio of 50.9:36.1:23.0 as established by the relative peak areas according to HPLC.

EXAMPLE 41

The procedure of Example 26 is repeated, but using as the starting material the mixture of terephthalic acids according to Example 19. About 39 parts of a solid solution are collected comprising the compounds of formulae

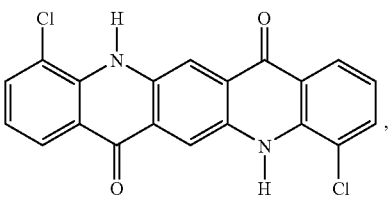
(120)

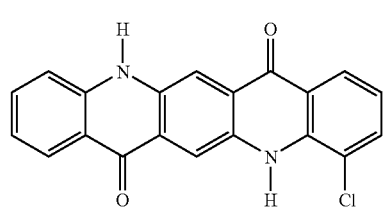
(121)

and (117) in a ratio of 42.3:37.2:20.5 as established by the relative peak areas according to HPLC.

EXAMPLE 42

The procedure of Example 26 is repeated, but using as the starting material the mixture of terephthalic acids according to Example 20. About 29 parts of a solid solution are collected comprising the compounds of formulae

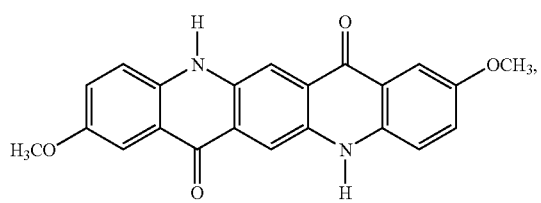
(122)

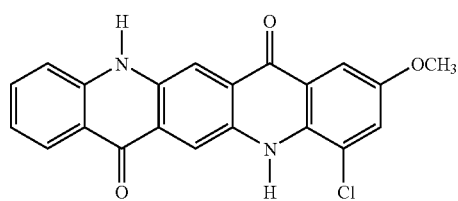
(123)

and (117) in a ratio of 52.1:25.7:22.2 as established by the relative peak areas according to HPLC.

EXAMPLE 43

The procedure of Example 26 is repeated, but using as the starting material the mixture of terephthalic acids according to Example 21. About 39 parts of a solid solution are collected comprising the compounds of formulae

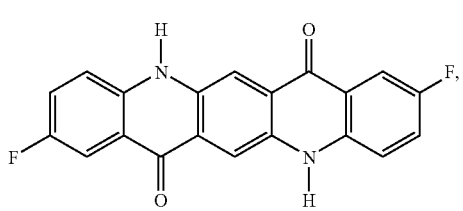
(124)

-continued

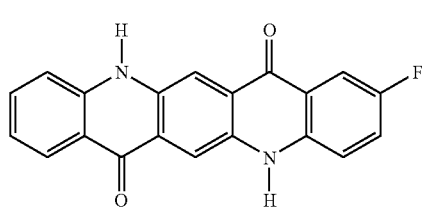
(125)

and (117) in a ratio of 44.9:43.1:12 as established by the relative peak areas according to HPLC.

EXAMPLE 44

The procedure of Example 26 is repeated, but using as the starting material the mixture of terephthalic acids according to Example 22. About 38 parts of a solid solution are collected comprising the compounds of formulae (117), (120), (121), (122), (123) and

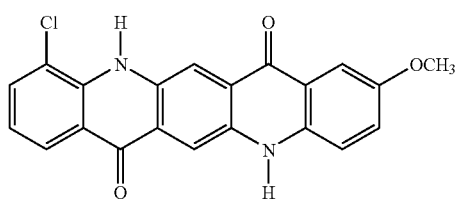
(126)

in a ratio of 8.8:26.2:25.7:25.9:13.4 as established by the relative peak areas according to HPLC.

EXAMPLE 45

The procedure of Example 26 is repeated, but using as the starting material the mixture of terephthalic acids according to Example 23. About 19 parts of a solid solution are collected comprising the compounds of formulae (115), (116), (117), (122), (123) and

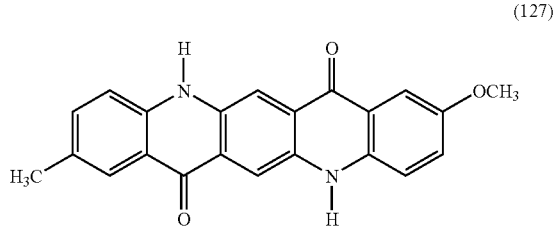
(127)

in a ratio of 39.7:35.3:9.7:9.5:5.8 as established by the relative peak areas according to HPLC.

EXAMPLE 46

The procedure of Example 26 is repeated, but using as the starting material the mixture of terephthalic acids according to Example 24. About 39 parts of a solid solution are collected comprising the compounds of formulae (117), (122), (123), (124), (125) and

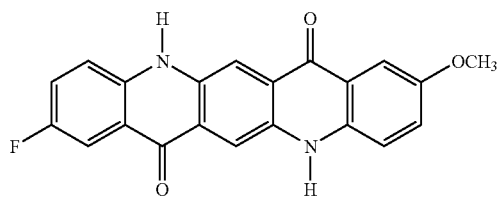
(128)

in a ratio of 13.1:22.8:27.1:30.5:6.5 as established by the relative peak areas according to HPLC.

APPLICATION EXAMPLES

Preparing Concentrates for Inkjet

EXAMPLE 47

The pigments made by the process of the invention are blended with the ingredients in Table 3 by a high speed Ultra-turrax mixer. A portion of the mix is then transferred into a Dynomill, Type KDL Spezial mill. 250 ml zirconium oxide beads (diameter 0.3–0.4 mm) are added to the milling chamber along with 600 g of millbase and dispersed 4 hours at 4500 rpm. Water cooling is adjusted so that the temperature during milling stays between 30° C. and 40° C.

TABLE 3

| Millbase Composition of Concentrate | |
|---|---|
| Examples 27–46 | 206.4 |
| Dispersant[1] | 258 |
| Other ingredients | 90.9 |
| (surface tension modifiers, alcohol, biocide and diethyleneglycol monobutylether) | |
| deionized Water | 644.7 |
| Total | 1200 |

[1]High molecular weight block-copolymer (water solution, 40% solids)

Preparing a Standard Ink for Inkjet (Printing) Applications 45.3 g of a concentrate according to Example 47 are admixed with 170.2 g of water, 48 g of a mixture of difunctional alcohols, 15 g of glycerol, 0.5 g of surface active agent, and 21 g of N-methyl pyrrolidone. This mixture is subsequently mixed for 10 minutes in an Ultra-turrax and then centrifuged for 60 minutes between 3000 rpm and 8000 rpm to remove oversized particles. After centrifuging, the supernatant dispersion is decanted and filtered by suction through 55 mm diameter Whatman GF/F glass fiber filter of 0.7 μm nominal cutoff. The thus obtained ink exhibits outstanding particle size distribution, viscosity, surface tension and storage stability properties, as required for ink jet printing applications. The ink is inserted into a customary wide-format commercial inkjet printer.

TABLE 4

Coloristic Properties of
Inkjet Prints on Epson Premium Glossy Photo Paper

| Dispersion of Inventive Red* | Ink Load | Optical Density[a] | L* D65/10° | a* D65/10° | b* D65/10° | C* D65/10° |
|---|---|---|---|---|---|---|
| Dynomill 4 h | 50% | 0.66 | 68.45 | 39.84 | −25.74 | 47.5 |
|  | 60% | 0.75 | 65.80 | 44.67 | −27.2 | 52.1 |
|  | 70% | 1.02 | 58.96 | 55.82 | −30.43 | 63.4 |
|  | 80% | 1.18 | 55.69 | 61.11 | −31.21 | 68.3 |
|  | 90% | 1.64 | 49.72 | 69.95 | −29.29 | 75.4 |
|  | 100% | 2.23 | 43.83 | 74.4 | −22.56 | 77.6 |

[a] Green Channel, Status A filter
b) The chromaticity coordinates of the ink jet prints are assessed using a Datacolor Elrepho 2000 spectrophotometer.
*Inventive Red is a composition of formulae (117), (116) and (115) in a ratio of 2.1 to 34.7 to 63.2 respectively as established by the relative peak areas according to HPLC and made according to the process of the invention.

Test prints with the ink compositions are notable for high color strength and brilliance.

Stability Evaluation in Plastic

EXAMPLE 48

Materials are blended by hand, shaken in a plastic bag using high-density polyethylene. Concentrations are 0.10% for masstone. Materials are compounded on a Leistritz extruder at 200° C. with a double pass. Heat stability is evaluated on an Arburg Injection Molder using the standard 5 minutes dwell time at 200, 240, 260, 280, and 300° C.

TABLE 5

Heat stability in HDPE

| HDPE 0.10% MASSTONE | L* | A* | B* | C* | H |
|---|---|---|---|---|---|
| Inventive Red* | | | | | |
| 200° C. | 40.57 | 45.23 | 1.29 | 45.25 | 1.63 |
| 240° C. | 40.46 | 45.33 | 1.30 | 45.35 | 1.65 |
| 260° C. | 40.60 | 44.83 | 1.53 | 44.86 | 1.96 |
| 280° C. | 40.67 | 44.80 | 1.24 | 44.82 | 1.58 |
| 300° C. | 40.78 | 44.89 | 1.52 | 44.92 | 1.93 |
| Comparative Example-C.I. Pigment Red 122 | | | | | |
| 200° C. | 39.42 | 42.59 | 0.74 | 42.59 | 1.00 |
| 240° C. | 39.61 | 43.01 | 1.10 | 43.02 | 1.47 |
| 260° C. | 39.84 | 43.13 | 1.15 | 43.14 | 1.53 |
| 280° C. | 40.00 | 43.51 | 1.29 | 43.53 | 1.69 |
| 300° C. | 40.32 | 43.55 | 1.07 | 43.56 | 1.41 |

Example 48 shows the inventive red to have greater color stability than the standard C.I. Pigment Red 122.

Universal Trade Sale Paint System.

EXAMPLE 49

Grind Premix

A glass beaker is charged with 441.67 grams propylene glycol, 201.72 grams de-ionized water 55.12 grams Alcolec S from the American Lecithin Company, Danbury Conn., and 100.68 grams IGEPAL CO-530 from GAF Chemicals, Wayne N.J. and ground for 1 hour to form a grind base premix.

Millbase 79.50 grams of the premix is charged to an 8 oz glass jar with 10 grams of inventive pigment, 10 grams of talc and 100 grams of glass beads and shaken in a Skandex blender for 90 minutes to form the colorant millbase.

Letdown Formulations 1 gram of millbase and 50 grams of flat aqueous latex is mixed to form a pastel tint. 5 grams of millbase and 50 grams of flat aqueous latex is mixed to form a deeptone tint.

TABLE 6

Color Comparison in Paint

| SAMPLE | DEEPTONE | | | PASTEL | | | |
|---|---|---|---|---|---|---|---|
|  | dL | dC | dh | dL | DC | dh | STR. |
| C.I. Pigment Red 122[b] | Std. | — | — | — | — | — | 100 |
| Inventive Red* | −0.3 | −0.5 | 1.1 | −0.7 | 0.8 | 0.7 | 109 | a) All color space value numbers L*, a*, b*, C* and h were measured using a D65 illuminant and 10 degree observer with a specular component included
[b] Hostaperm Pink EWD from Clariant.

Example 49 color comparisons show high color strength for the inventive red in comparison to the standard.

We claim:

1. A quinacridone pigment composition comprising
(a) at least one symmetrical quinacridone of formula

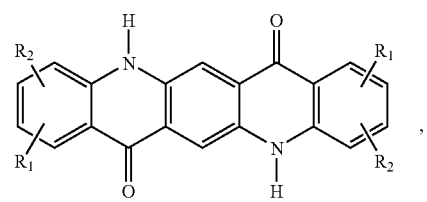

(1)

(b) at least one unsymmetrical quinacridone of formula

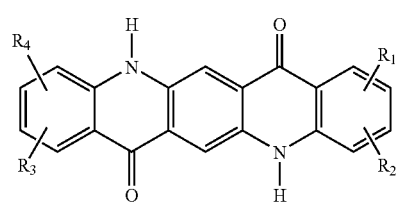

(2)

and
(c) at least one symmetrical quinacridone of formula

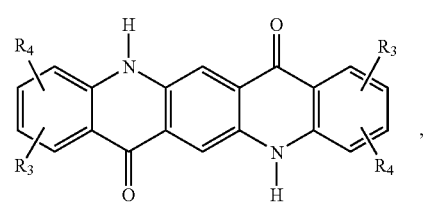

(3)

in which $R_1$ is methyl, $R_3$ is hydrogen, and $R_2$, and $R_4$ are each independently of the other hydrogen, $C_1$–$C_4$alkyl unsubstituted or substituted by halogen, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, carboxy or nitro, wherein at least one of $R_1$ and $R_2$ is different from each of $R_3$ and $R_4$ and/or at least one of the positions of $R_1$ and $R_2$ is different from each of the positions of $R_3$ and $R_4$, with the proviso that the unsymmetrical b) quinacridone is not 1,10-dimethylquinacridone or 1,10-dichloroquinacridone and comprising from 65 to 95% by weight of at least one symmetrical component of formula (1), and from 5 to 35% by weight of the sum of at least one unsymmetrical component of formula (2) and at least one symmetrical component of formula (3), based on the total weight of the components of formulae (1), (2) and (3) in the composition.

2. A quinacridone pigment composition according to claim 1, comprising from 70 to 90% by weight of at least one symmetrical component of formula (1), and from 10 to 30% by weight of the sum of at least one unsymmetrical component of formula (2) and at least one symmetrical component of formula (3), based on the total weight of the components of formulae (1), (2) and (3) in the composition.

3. A pigment composition according to claim 1, wherein a) is 2,9 dimethylquinacridone, b) is monomethylquinacridone and c) is unsubstituted quinacridone.

4. A process for the preparation of a quinacridone composition comprising (a) at least one symmetrical quinacridone of formula

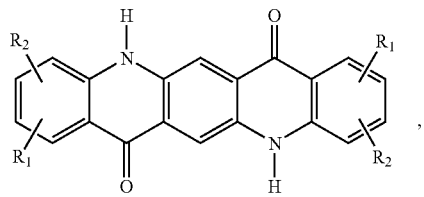

(1)

(b) at least one unsymmetrical quinacridone of formula

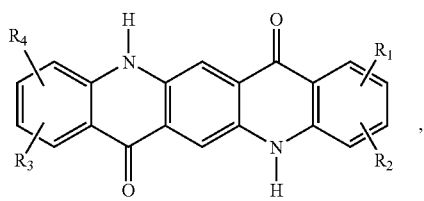

(2)

and (c) at least one symmetrical quinacridone of formula

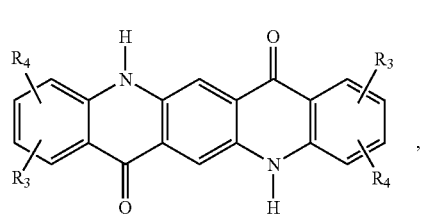

(3)

in which $R_1$, $R_2$, $R_3$ and $R_4$ are each independently of the other hydrogen, $C_1$–$C_4$alkyl unsubstituted or substituted by halogen, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, carboxy or nitro, wherein at least one of $R_1$ and $R_2$ is different from each of $R_3$ and $R_4$ and/or at least one of the positions of $R_1$ and $R_2$ is different from each of the positions of $R_3$ and $R_4$, (i) reacting a compound of formula

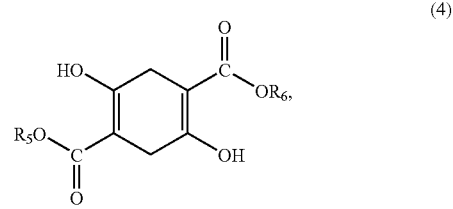

(4)

in which $R_5$ and $R_6$ are each independently of the other $C_1$–$C_4$alkyl, with at least double the molar amount of a mixture of the amines of formulae,

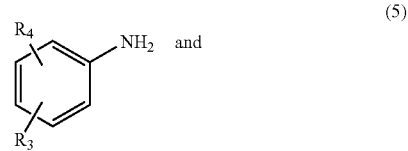

(5)

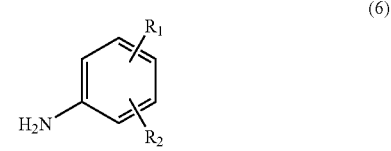

(6)

wherein the amines of formulae (5) and (6) are added sequentially to yield a composition comprising at least one compound of formula

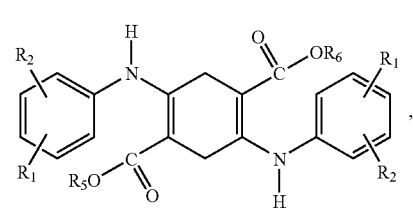

(7)

at least one compound of formula

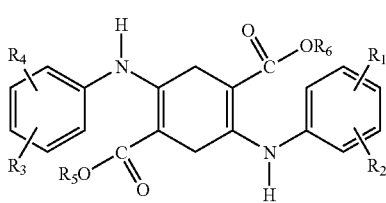

(8)

and at least one compound of formula

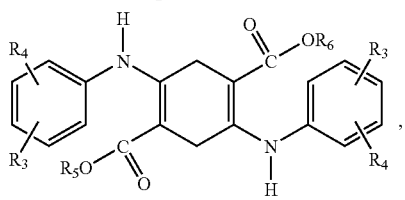
(9)

(ii) oxidizing and hydrolyzing the composition obtained according to step (i), with or without isolation, to yield a composition comprising at least one compound of formula

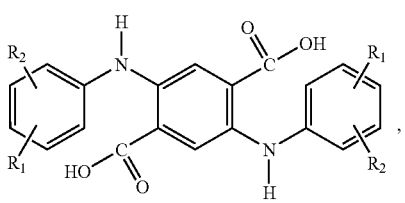
(10)

at least one compound of formula

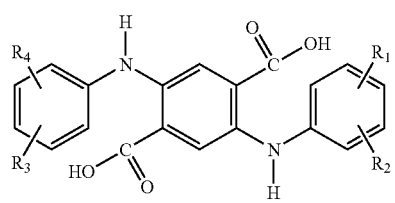
(11)

and at least one compound of formula

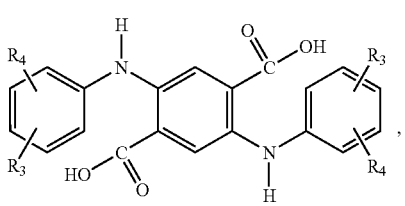
(12)

and (iii) cyclizing of the composition obtained according to step (ii) to yield a composition comprising
(a) at least one symmetrical quinacridone of formula (1),
(b) at least one unsymmetrical quinacridone of formula (2), and
(c) at least one symmetrical quinacridone of formula (3).

5. The process according to claim 4, wherein the hydrolyzation according to step (ii) and the cyclization according to step (iii) are performed prior to the oxidation according to step (ii).

6. The process according to claim 4, wherein the compound of formula (4) is dimethylsuccinylo succinate.

7. The process according to claim 4, wherein the amines of formulae (5) and (6) are selected from the group consisting of aniline, para-chloroaniline, ortho-chloroaniline, para-fluoroaniline, ortho-fluoroaniline, para-toluidine, ortho-toluidine, para-anisidine, ortho-anisidine, meta-anisidine, para-dimethylaminoaniline, and 3-chloro-4-methylaniline.

8. The process according to claim 4, wherein aniline is used as the amine of formulae (5) and para-chloroaniline, ortho-chloroaniline, para-fluoroaniline, para-toluidine, para-anisidine or para-dimethylaminoaniline is used as the amine of formulae (6).

9. The process according to claim 4, wherein the amine of formulae (5) is applied in an amount of from 1 to 70% by weight, based on the total weight of the amines of formulae (5) and (6) in the reaction mixture.

10. The process according to claim 4, wherein the amine of formulae (5) is applied in an amount of from 1 to 45% by weight, based on the total weight of the amines of formulae (5) and (6) in the reaction mixture.

11. The process according to claim 4, wherein the amine of formulae (5) is applied in an amount of from 1 to 30% by weight, based on the total weight of the amines of formulae (5) and (6) in the reaction mixture.

12. A method of coloring inkjet inks, electrophotographic toner or developer comprising the step of adding an effective coloring amount of a quinacridone composition comprising
(a) at least one symmetrical quinacridone of formula

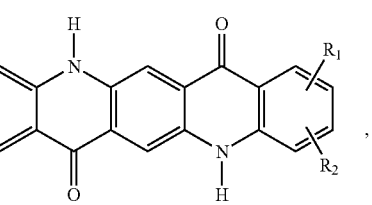
(1)

(b) at least one unsymmetrical quinacridone of formula

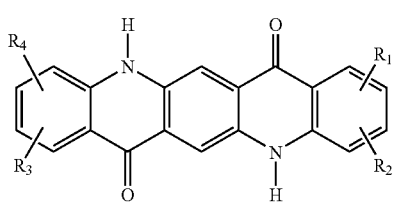
(2)

and
(c) at least one symmetrical quinacridone of formula

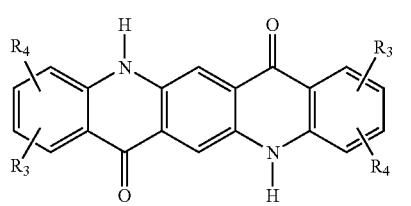
(3)

in which
$R_1$, $R_2$, $R_3$ and $R_4$ are each independently of the other hydrogen, $C_1$–$C_4$alkyl unsubstituted or substituted by halogen, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, carboxy or nitro, wherein at least one of $R_1$ and $R_2$ is different from each of $R_3$ and $R_4$ and/or at least one of the positions of $R_1$ and $R_2$ is different from each of the positions of $R_3$ and $R_4$, to said electrophotographic toner or developer inkjet inks to be colored.

13. An inkjet ink, or an electrophotographic toner or developer containing the quinacridone composition comprising (a) at least one symmetrical quinacridone of formula

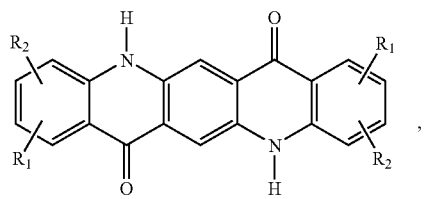

(1)

(b) at least one unsymmetrical quinacridone of formula

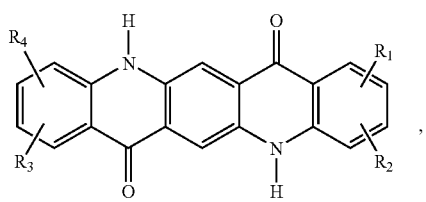

(2)

and (c) at least one symmetrical quinacridone of formula

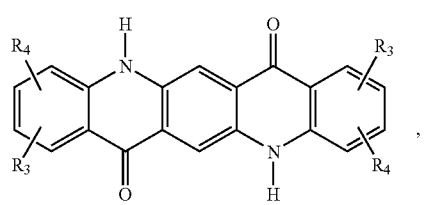

(3)

in which $R_1$, $R_2$, $R_3$ and $R_4$ are each independently of the other hydrogen, $C_1$–$C_4$alkyl unsubstituted or substituted by halogen, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, carboxy or nitro, wherein at least one of $R_1$ and $R_2$ is different from each of $R_3$ and $R_4$ and/or at least one of the positions of $R_1$ and $R_2$ is different from each of the positions of $R_3$ and $R_4$.

14. An inkjet ink, an electrophotographic toner or developer containing the quinacridone composition according to claim 13 wherein $R_1$ is methyl, and $R_3$ is hydrogen.

15. An electrophotographic toner or developer according to claim 13, wherein the toner or developer is a one- or two-component powder toners, magnetic toner, liquid toner, latex toner, polymerization toner or specialty toner.

16. A process for the preparation of a quinacridone composition comprising (a) at least one symmetrical quinacridone of formula

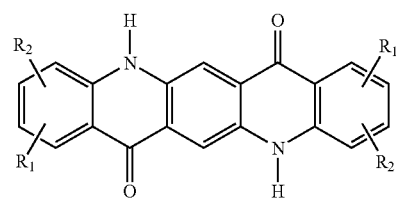

(1)

(b) at least one unsymmetrical quinacridone of formula

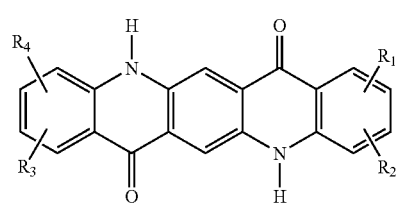

(2)

and (c) at least one symmetrical quinacridone of formula

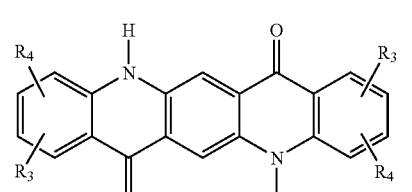

(3)

in which $R_1$, $R_2$, $R_3$ and $R_4$ are each independently of the other hydrogen, $C_1$–$C_4$alkyl unsubstituted or substituted by halogen, $C_1$–$C_4$alkoxy, halogen, carbamoyl, N—$C_1$–$C_4$alkylcarbamoyl, N,N-di-$C_1$–$C_4$alkylcarbamoyl, N,N-di-$C_1$–$C_4$alkylamino, carboxy or nitro, wherein at least one of $R_1$ and $R_2$ is different from each of $R_3$ and $R_4$ and/or at least one of the positions of $R_1$ and $R_2$ is different from each of the positions of $R_3$ and $R_4$, (i) reacting a compound of formula

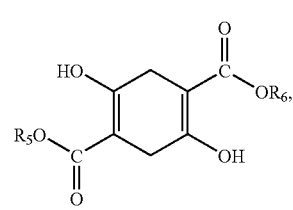

(4)

in which $R_5$ and $R_6$ are each independently of the other $C_1$–$C_4$alkyl, with at least double the molar amount of a mixture of the amines of formulae,

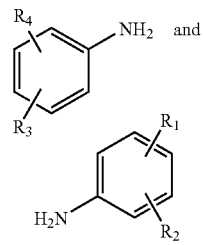
(5)

and

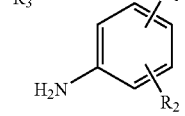
(6)

wherein the amines of formulae (5) and (6) are added simultaneously or sequentially to yield a composition comprising at least one compound of formula

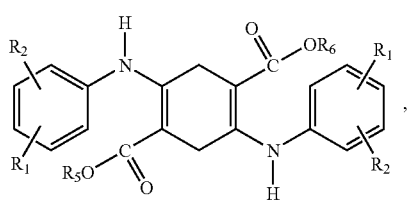
(7)

, at least one compound of formula

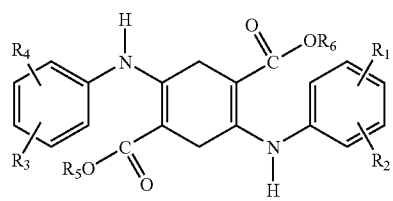
(8)

and at least one compound of formula

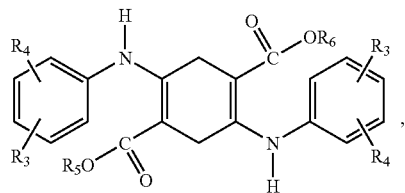
(9)

, (ii) oxidizing and hydrolyzing the composition obtained according to step (i), with or without isolation, to yield a composition comprising at least one compound of formula

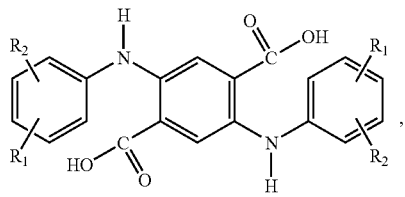
(10)

at least one compound of formula

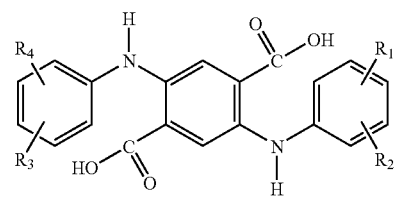
(11)

and at least one compound of formula

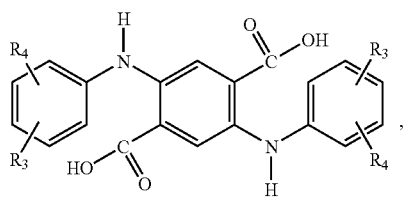
(12)

, and (iii) cyclizing of the composition obtained according to step (ii) to yield a composition comprising
  (a) at least one symmetrical quinacridone of formula (1),
  (b) at least one unsymmetrical quinacridone of formula (2), and
  (c) at least one symmetrical quinacridone of formula (3), wherein the amine of formulae (5) is applied in an amount of from 1 to 30% by weight, based on the total weight of the amines of formulae (5) and (6) in the reaction mixture.

* * * * *